United States Patent
Schwartz et al.

(10) Patent No.: US 11,992,157 B2
(45) Date of Patent: May 28, 2024

(54) DEEP FRYER TANK, AND ELECTRIC DEEP FRYER COMPRISING SUCH A TANK

(71) Applicant: SEB S.A., Ecully (FR)

(72) Inventors: Delphine Schwartz, Dijon (FR); Frédéric Pain, Varois-Et-Chaignot (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 18/031,554

(22) PCT Filed: Oct. 14, 2021

(86) PCT No.: PCT/EP2021/078387
§ 371 (c)(1),
(2) Date: Apr. 12, 2023

(87) PCT Pub. No.: WO2022/079140
PCT Pub. Date: Apr. 21, 2022

(65) Prior Publication Data
US 2023/0346164 A1    Nov. 2, 2023

(30) Foreign Application Priority Data

Oct. 15, 2020   (FR) ...................................... 2010581

(51) Int. Cl.
*A47J 37/12*    (2006.01)
(52) U.S. Cl.
CPC .......... *A47J 37/129* (2013.01); *A47J 37/1261* (2013.01)
(58) Field of Classification Search
CPC .............................. A47J 37/129; A47J 37/1261
USPC ........................................................ 99/403
See application file for complete search history.

(56) References Cited

U.S. PATENT DOCUMENTS

| | | | | |
|---|---|---|---|---|
| 1,228,956 A | * | 6/1917 | Noonan .............. | A47J 37/0704 126/41 R |
| 2,001,285 A | * | 5/1935 | Rehm ...................... | F24C 7/00 219/404 |
| 3,338,156 A | * | 8/1967 | Angelos ................ | A47J 37/044 99/427 |
| 4,913,041 A | * | 4/1990 | Taber .................. | A47J 37/1242 99/330 |
| 5,209,218 A | * | 5/1993 | Daneshvar .......... | A47J 37/1247 126/374.1 |

(Continued)

FOREIGN PATENT DOCUMENTS

| FR | 2788213 A1 | 7/2000 |
|---|---|---|
| FR | 2794959 A1 | 12/2000 |
| KR | 19980021426 U | 7/1998 |

OTHER PUBLICATIONS

International Search Report for Application No. PCT/EP2021/078387 dated Jan. 24, 2022. 3 pages.

*Primary Examiner* — Eric S Stapleton
(74) *Attorney, Agent, or Firm* — Lerner David LLP

(57) ABSTRACT

A deep fryer tank made of a deep-drawn metal material includes a bottom and several sides connected to the bottom by curves, at least one of the sides having at least one rigidifying lateral indentation forming a lateral recess extending in one direction.
At least one side has at least one other rigidifying lateral indentation forming another lateral recess extending in another direction, and the at least one rigidifying lateral indentation intersects the at least one other rigidifying lateral indentation.
An electric deep fryer comprises a deep fryer tank of the aforementioned type.

22 Claims, 5 Drawing Sheets

(56) References Cited

U.S. PATENT DOCUMENTS

| | | | | |
|---|---|---|---|---|
| 5,832,810 A * | 11/1998 | Brawley, Sr. | A47J 37/1271 | 99/403 |
| 6,058,245 A * | 5/2000 | McNamara, Jr. | A47J 37/1266 | 126/374.1 |
| 6,677,556 B1 * | 1/2004 | Huang | A47J 37/1261 | 219/439 |
| 6,742,444 B1 * | 6/2004 | Lai | A47J 37/1209 | 99/330 |
| 7,141,764 B1 * | 11/2006 | Shumate | A47J 37/1261 | 219/439 |
| 7,211,770 B2 * | 5/2007 | Wilson | A47J 37/1261 | 219/439 |
| 7,881,593 B2 * | 2/2011 | Grassi | F24C 3/126 | 99/279 |
| 2001/0015137 A1 * | 8/2001 | O'Grady | A47J 37/0718 | 99/449 |
| 2002/0162923 A1 * | 11/2002 | Geddes | F24C 15/36 | 248/176.1 |
| 2002/0174776 A1 * | 11/2002 | Nockermann | A47J 37/1233 | 99/330 |
| 2003/0066522 A1 * | 4/2003 | Pestrue | A47J 37/0713 | 126/41 R |
| 2003/0126995 A1 * | 7/2003 | Sebastiao | A47J 36/20 | 99/422 |
| 2003/0192874 A1 * | 10/2003 | Lerner | F23N 5/082 | 219/448.11 |
| 2005/0098047 A1 * | 5/2005 | Steinberg | F24C 15/16 | 99/450 |
| 2005/0204931 A1 * | 9/2005 | Cheng | A47J 37/067 | 99/422 |
| 2006/0150827 A1 * | 7/2006 | Bruno | A47J 37/067 | 99/450 |
| 2006/0219099 A1 * | 10/2006 | Pan | A21B 7/005 | 99/348 |
| 2006/0272633 A1 * | 12/2006 | Osias, Jr. | A47J 37/1276 | 126/383.1 |
| 2007/0295223 A1 * | 12/2007 | Reischmann | A47J 37/0713 | 99/444 |
| 2009/0025574 A1 * | 1/2009 | Byrnes | A47J 37/0704 | 426/523 |
| 2009/0095168 A1 * | 4/2009 | Shu | A47J 37/067 | 99/425 |
| 2009/0107344 A1 * | 4/2009 | Bivens | A47J 37/1223 | 210/167.28 |
| 2010/0000419 A1 * | 1/2010 | Payen | A47J 36/38 | 99/408 |
| 2010/0071564 A1 * | 3/2010 | Jones | A47J 37/129 | 99/418 |
| 2011/0185916 A1 * | 8/2011 | Penny | A47J 37/07 | 99/340 |
| 2012/0031918 A1 * | 2/2012 | Gotsis | A47J 27/002 | 220/752 |
| 2012/0247448 A1 * | 10/2012 | Thibodeaux | A47J 37/07 | 126/25 R |
| 2013/0052310 A1 * | 2/2013 | Stanford | A23L 5/11 | 99/333 |
| 2013/0193044 A1 * | 8/2013 | Coco | A47J 37/1223 | 210/167.28 |
| 2013/0298781 A1 * | 11/2013 | Ganuza | A47J 37/0623 | 99/447 |
| 2013/0319254 A1 * | 12/2013 | Yu | A21B 7/005 | 99/348 |
| 2014/0020568 A1 * | 1/2014 | Huang | F28D 1/06 | 99/403 |
| 2014/0266939 A1 * | 9/2014 | Baringer | H01Q 7/00 | 343/729 |
| 2014/0302211 A1 * | 10/2014 | Rose | A47J 37/1266 | 99/403 |
| 2015/0068944 A1 * | 3/2015 | Zhang | B65D 21/0233 | 206/505 |
| 2016/0007737 A1 * | 1/2016 | Clark | B65D 25/30 | 211/186 |
| 2019/0110482 A1 * | 4/2019 | Wang | A47J 37/00 | |

* cited by examiner

[Fig. 1]
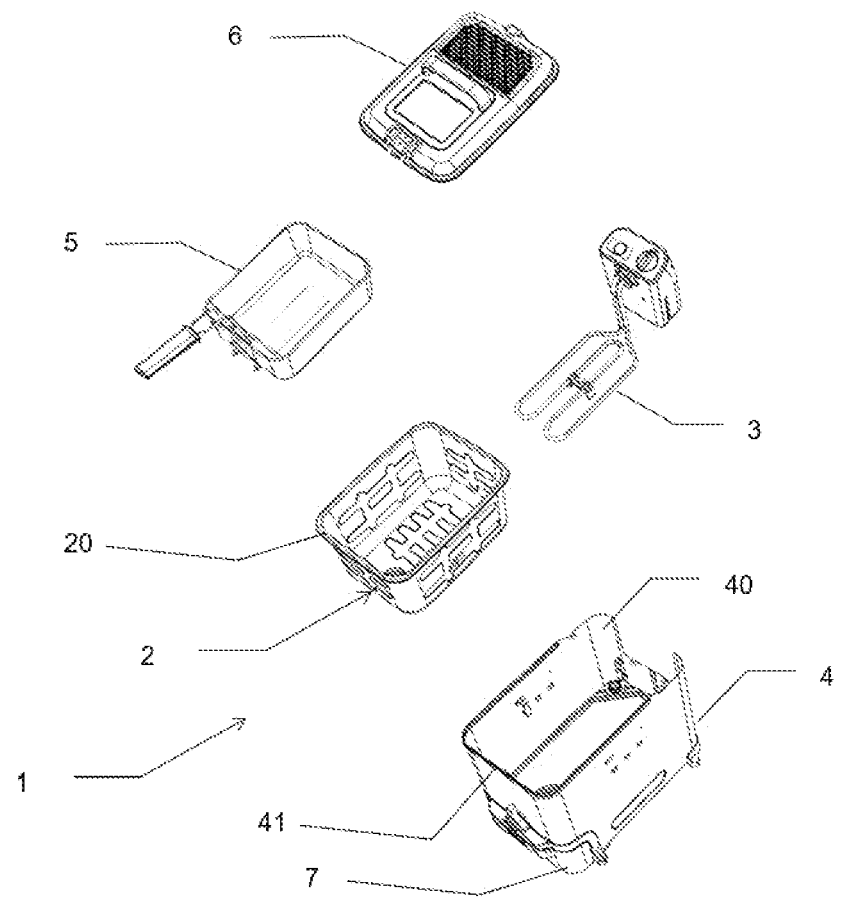

[Fig. 2]
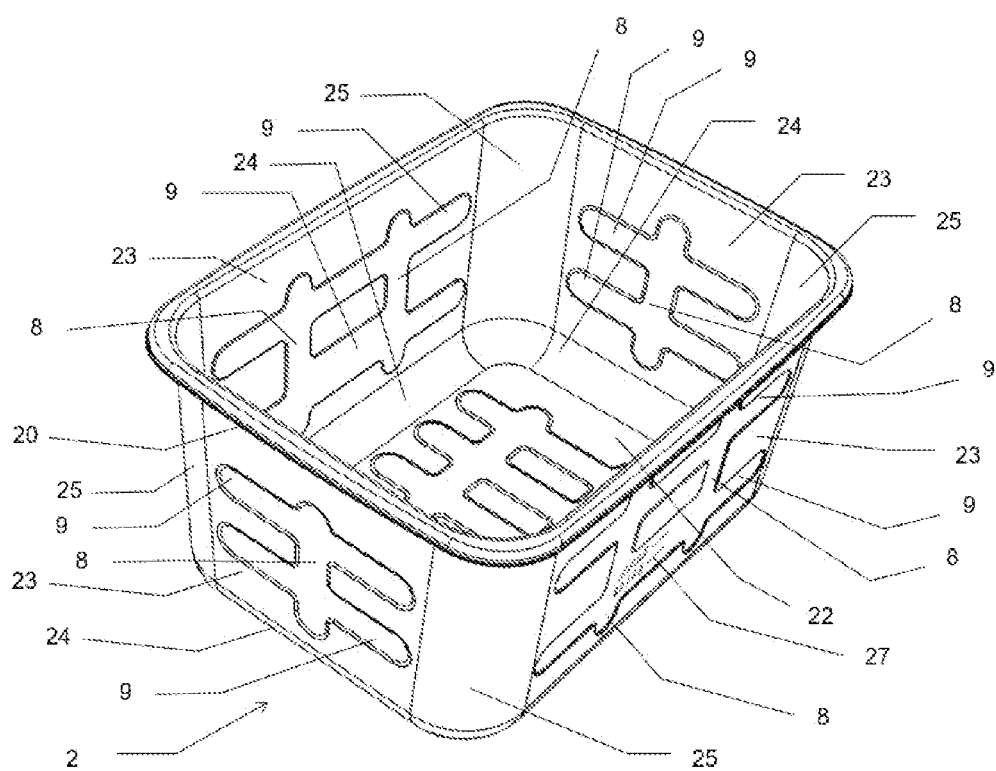

[Fig. 3]
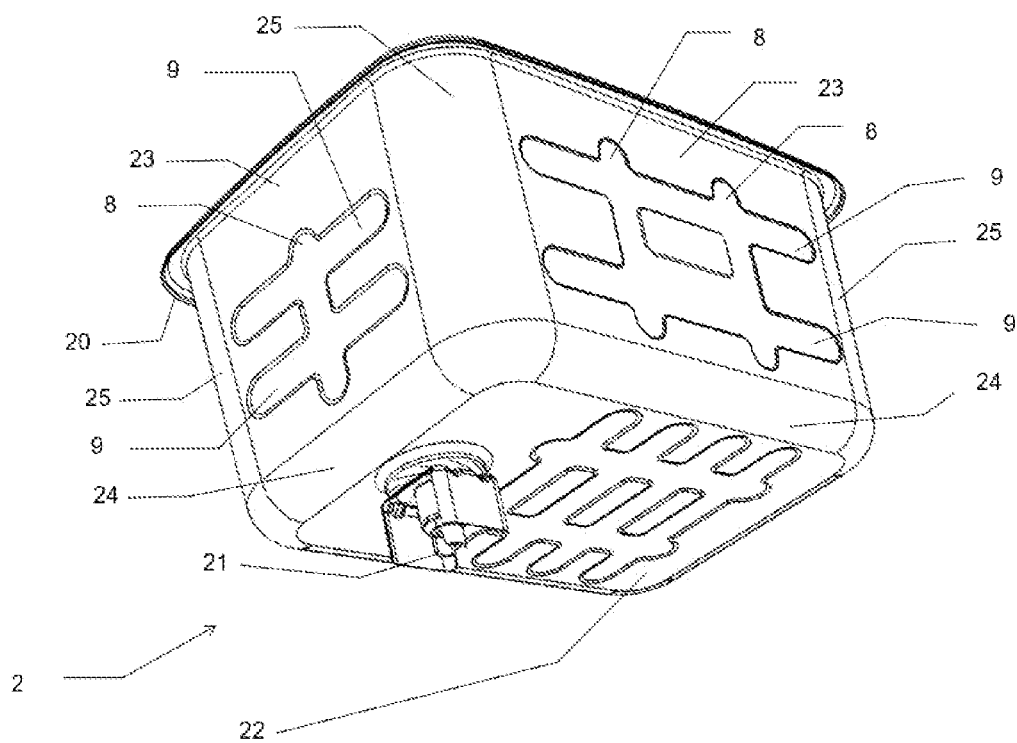

[Fig. 4]
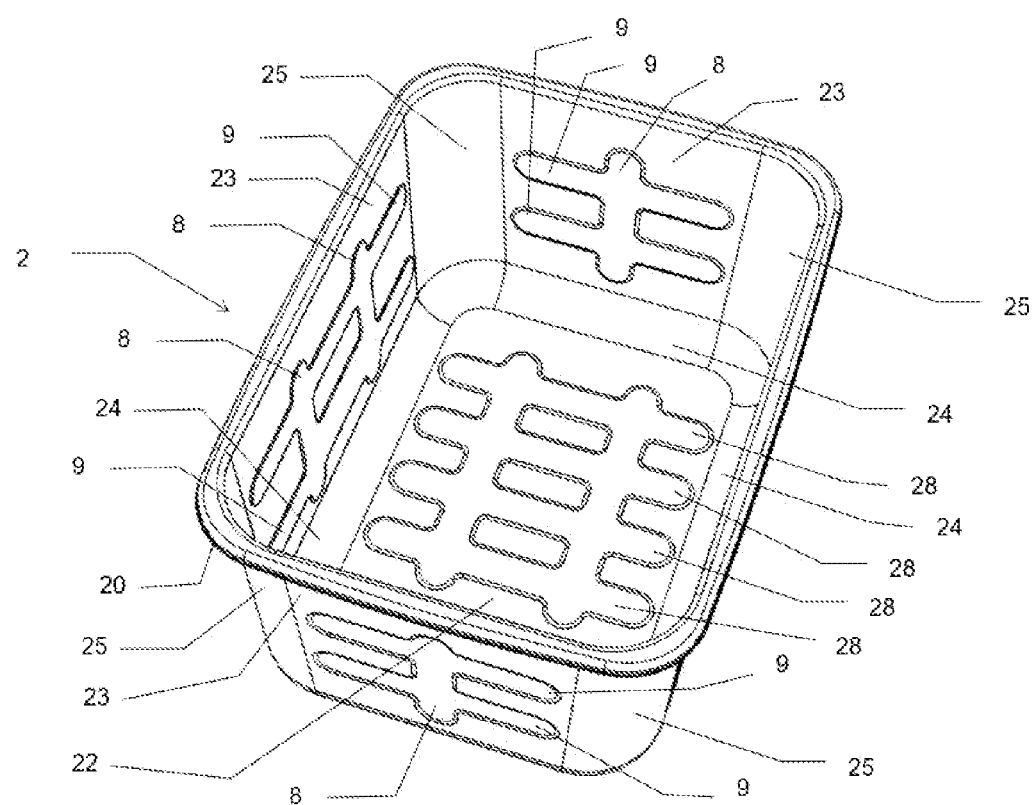

[Fig. 5]
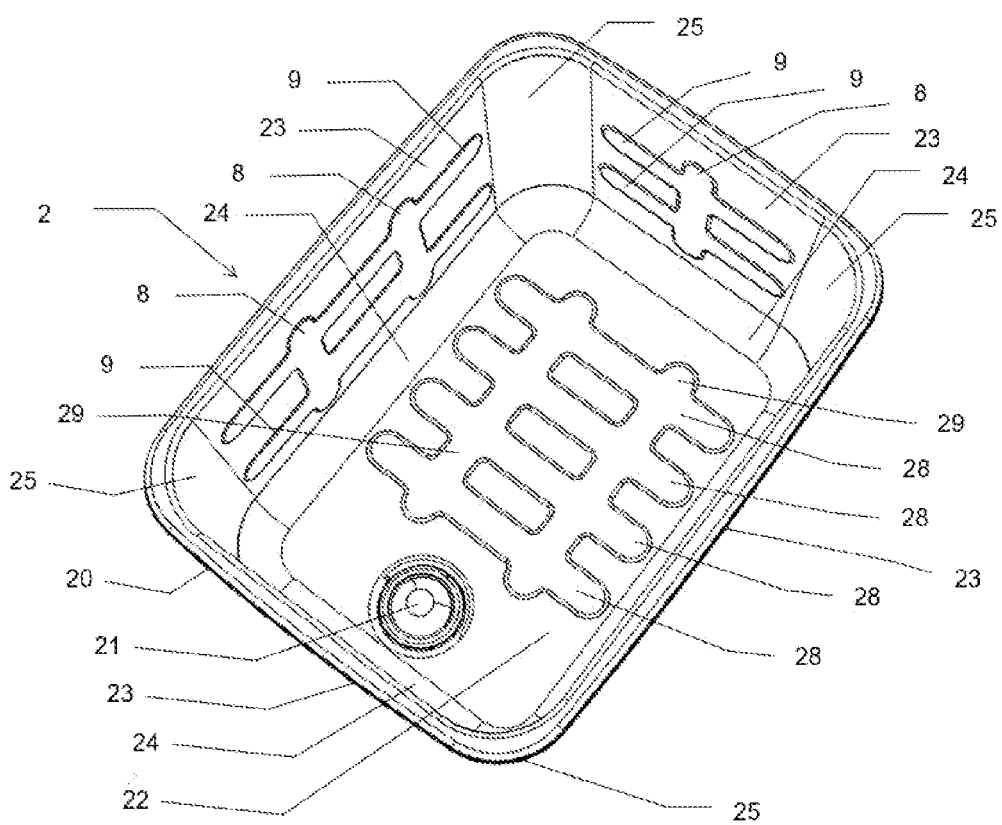

DEEP FRYER TANK, AND ELECTRIC DEEP FRYER COMPRISING SUCH A TANK

CROSS-REFERENCE TO RELATED APPLICATIONS

The present application is a national phase entry under 35 U.S.C. § 371 of International Application No. PCT/EP2021/078387 filed Oct. 14, 2021, which claims priority from French Application No. 2010581 filed on Oct. 15, 2020, all of which are incorporated herein by reference.

The present invention relates to the technical field of deep fryers for preparing fried food in a frying bath. The frying bath may be an oil bath or a molten fat bath. The present invention relates more particularly to a deep fryer tank used to hold the frying bath and the food to be fried.

The present invention also relates to an electric deep fryer comprising such a tank.

In particular, but not exclusively, the present invention relates to an electric deep fryer comprising an electric immersion heating device intended to be immersed in the frying bath contained in the tank or an electric induction heating device intended to heat the tank by induction.

In deep fryer tanks made of deep-drawn metal material, phenomena involving sudden deformation of the side walls have been observed. These phenomena are due to the high thermal amplitude of the frying bath, to the thermal expansion of the metal material and to the release of the stresses generated during the deep-drawing operation. These phenomena can generate alarming noises such as popping, or even oil splatters. These phenomena are particularly troublesome when the deep fryer is used without a lid while cooking, especially when the oil-laden food is positioned in the basket above the frying bath.

One purpose of the present invention is to limit sudden deformations of a deep fryer tank made of deep-drawn metal material.

These purposes are achieved with a deep fryer tank made of deep-drawn metal material, which has a bottom and several sides connected to the bottom by curves, at least one of the sides having at least one rigidifying lateral indentation forming a lateral recess extending in one direction, due to the at least one side having at least one other rigidifying lateral indentation forming another lateral recess extending in another direction, and to said at least one rigidifying lateral indentation intersecting said at least one other rigidifying lateral indentation. In other words, said rigidifying lateral indentation extends on either side of said other rigidifying lateral indentation, and said other rigidifying lateral indentation extends on either side of said rigidifying lateral indentation. These features improve the rigidity of said side and limit the sudden deformation phenomena.

Said at least one rigidifying lateral indentation and said at least one other rigidifying lateral indentation may extend into the deep fryer tank. It is in fact easier to make indentations into the tank than outward from the tank.

Said at least one rigidifying lateral indentation and said at least one other rigidifying lateral indentation may extend exclusively along the sides. Each indented surface helps keep the deformation from spreading.

Said at least one rigidifying lateral indentation and said at least one other rigidifying lateral indentation may be surrounded by non-indented portions of the sides. In fact, the rigidity is provided by the joints, that is, by the intersections between one rigidifying lateral indentation and another rigidifying lateral indentation.

The direction and the other direction may have an angle comprised between 60° and 120°, and preferably comprised between 80° and 100°.

The direction and the other direction may in particular be perpendicular.

The other direction may extend parallel to the bottom.

The direction may extend perpendicular to the bottom.

Several sides, and preferably all of the sides, may have said at least one rigidifying lateral indentation and said at least one other rigidifying lateral indentation. This arrangement makes it possible to reduce the phenomena of popping or sudden deformation even more significantly when the frying bath contained in the deep fryer tank is heating up or cooling down.

All of the sides may have two other rigidifying lateral indentations extending parallel to the bottom. This arrangement helps reduce the phenomena of popping or sudden deformation when the frying bath contained in the deep fryer tank is heating up or cooling down.

The deep fryer tank may be parallelepipedal. Parallelepipedal deep fryer tanks are more prone to popping or sudden deformation when the frying bath contained in the deep fryer tank is heating up or cooling down than deep fryer tanks with rounded or circular side walls.

Two opposite sides may have two additional rigidifying lateral indentations extending perpendicular to the bottom. This arrangement helps reduce the phenomena of popping or sudden deformation of the large sides of parallelepipedal deep fryer tanks when the frying bath contained in the deep fryer tank is heating up or cooling down.

One of the two other rigidifying lateral indentations of said two opposite sides may have a greater height between the rigidifying lateral indentations than on the outside of the rigidifying lateral indentations. This arrangement helps further reduce the phenomena of popping or sudden deformation of the large sides of parallelepipedal deep fryer tanks when the frying bath contained in the deep fryer tank is heating up or cooling down.

The bottom may have at least one lower rigidifying indentation forming a lower recess extending in a first direction and at least one other lower rigidifying indentation forming another lower recess extending in a second direction, said at least one lower rigidifying indentation intersecting said at least one other lower rigidifying indentation. This arrangement helps reduce the phenomena of popping or sudden deformation of the bottoms of deep fryer tanks when the frying bath contained in the deep fryer tank is heating up or cooling down.

The deep fryer tank may be made of stainless steel. This material is commonly used for deep fryer tanks and has the advantage of a slower temperature ramp-up on the walls of the tank, which delays the temperature ramp-up of the oil in the bottom of the tank. However, this material has the drawback of being more prone to sudden deformation phenomena when the frying bath contained in the deep fryer tank is heating up or cooling down than other materials, particularly such as enameled steel.

These purposes are also achieved with an electric deep fryer comprising a deep fryer tank and an electric heating device, in which the deep fryer tank conforms to at least one of the above features.

According to one embodiment, the electric heating device may be an electric immersion heating device configured to be immersed in a frying bath contained in the deep fryer tank.

According to another embodiment, the electric heating device may be an electric induction heating device intended to heat the deep fryer tank by induction.

The electric deep fryer may comprise an outer housing with an upper opening, the deep fryer tank being arranged in the outer housing.

The deep fryer tank may then comprise an outer peripheral rim, and the outer housing may then comprise an upper edge, the outer peripheral rim resting on the upper edge.

The invention will be better understood from the study of an exemplary embodiment, taken without any limitation, illustrated in the attached figures, in which:

FIG. 1 is a perspective and exploded view of an exemplary embodiment of an electric deep fryer comprising a deep fryer tank according to the invention, FIG. 2 is a top perspective view of the deep fryer tank illustrated in FIG. 1, FIG. 3 is a perspective view from underneath of the deep fryer tank illustrated in FIGS. 1 and 2, FIG. 4 is a top perspective view of the deep fryer tank illustrated in FIGS. 1, 2, and 3 showing part of the bottom of the deep fryer tank, FIG. 5 is a top perspective view of the deep fryer tank illustrated in FIGS. 1, 2, 3, and 4 showing the bottom of the deep fryer tank.

The electric deep fryer 1 illustrated in FIG. 1 comprises a deep fryer tank 2 and an electric heating device 3. The deep fryer tank 2 is configured to hold the frying bath and the food to be fried.

In the exemplary embodiment illustrated in FIG. 1, the electric heating device 3 is an electric immersion heating device configured to be immersed in a frying bath contained in the deep fryer tank 2.

As a variant, the electric heating device 3 may in particular be an electric induction heating device intended to heat the deep fryer tank 2 by induction.

In the exemplary embodiment illustrated in FIG. 1, the electric deep fryer 1 comprises an outer housing 4 with an upper opening 40. The outer housing 4 has an upper edge 41 delimiting the upper opening 40. The upper edge 41 is flat. The deep fryer tank 2 is removably mounted relative to the outer housing 4. According to a preferred embodiment, the deep fryer tank 2 comprises an outer peripheral rim 20. In the configuration in which the deep fryer 1 is to be used, the deep fryer tank 2 is arranged in the outer housing 4. The outer peripheral rim 20 rests on the upper edge 41.

In the exemplary embodiment illustrated in FIG. 1, the electric deep fryer 1 comprises a cooking basket 5 and a lid 6. The lid 6 can be used for cooking or for storage.

In the exemplary embodiment illustrated in FIG. 1, the electric deep fryer 1 comprises a drain pan 7 configured to collect the fat contained in the deep fryer tank 2. For this purpose the deep fryer tank 2 comprises a drain mechanism 21, which can be seen more clearly in FIGS. 3 and 5.

The deep fryer tank 2 is made of deep-drawn metal material. The deep fryer tank 2 may in particular be made of stainless steel. As a variant, the deep fryer tank 2 may in particular be made of enameled steel or aluminum.

The deep fryer tank 2 may comprise level markings 27. The deep fryer tank 2 has, for example, a thickness of about 0.6 mm. The tolerance of the thickness of the deep fryer tank 2 is preferably ±0.1 mm.

As can be more clearly seen in FIGS. 2 through 5, the deep fryer tank 2 has a bottom 22 and several sides 23 connected to the bottom 22 by curves 24. Adjacent sides 23 are connected to each other by other curves 25.

In the deep fryer tank 2 according to the invention, at least one of the sides 23 has a rigidifying lateral indentation 8 forming a lateral recess extending in one direction, as well as another rigidifying lateral indentation 9 forming another lateral recess extending in another direction, and said rigidifying lateral indentation 8 intersects with said other rigidifying lateral indentation 9.

The level markings 27 may extend into one of the rigidifying lateral indentations 8 and/or into one of the other rigidifying lateral indentations 9. However, the level markings 27 are preferably made on flat surfaces. If desired, the level markings 27 extend exclusively into one of the rigidifying lateral indentations 8 and/or into one of the other rigidifying lateral indentations 9.

More particularly in the exemplary embodiment illustrated in the figures, all of the sides 23 have at least one of the rigidifying lateral indentations 8 and at least one of the other rigidifying lateral indentations 9. As can be more clearly seen in FIGS. 4 and 5, all of the rigidifying lateral indentations 8 and all of the other rigidifying lateral indentations 9 are surrounded by non-indented portions of the sides 23.

More particularly in the exemplary embodiment illustrated in the figures, the direction and the other direction are perpendicular. The direction extends perpendicular to the bottom 22 and the other direction extends parallel to the bottom 22.

More particularly in the exemplary embodiment illustrated in the figures, the deep fryer tank 2 is parallelepipedal. In other words, the deep fryer tank 2 has four sides 23 opposite each other in pairs. Apart from the rigidifying lateral indentations 8 and the other rigidifying lateral indentations 9, the sides 23 may have a flat geometry. As can be clearly seen in FIGS. 2 through 5, the rigidifying lateral indentations 8 and the other rigidifying lateral indentations 9 extend into the deep fryer tank 2. The rigidifying lateral indentations 8 and the other rigidifying lateral indentations 9 extend exclusively along the sides 23.

More particularly, in the exemplary embodiment illustrated in the figures, all of the sides 23 have two other rigidifying lateral indentations 9 extending parallel to the bottom 22. The sides 23 comprise two first opposite sides 23 that have two rigidifying lateral indentations 8 extending perpendicular to the bottom 22. One of the two other rigidifying lateral indentations 9 of said two opposite sides 23 has a greater height between the rigidifying lateral indentations 8 than on the outside of the rigidifying lateral indentations 8. The sides 23 comprise two second opposite sides 23 that have a single rigidifying lateral indentation 8 extending perpendicular to the bottom 22. On a same side, the other rigidifying lateral indentations 9 extend perpendicular to the rigidifying lateral indentation 8 or to the rigidifying lateral indentations 8.

More particularly, in the exemplary embodiment illustrated in the figures, the bottom 22 has lower rigidifying indentations 28 intersecting with other lower rigidifying indentations 29. Each of the lower rigidifying indentations 28 forms a lower recess extending in a first direction. Each of the other lower rigidifying indentations 29 forms another lower recess extending in a second direction. The first direction and the second direction are perpendicular. The first direction and the second direction each extend parallel or perpendicular to each of the sides. The lower rigidifying indentations 28 and the other lower rigidifying indentations 29 extend into the deep fryer tank 2. As can be more clearly seen in FIGS. 4 and 5, the bottom 22 has four lower rigidifying indentations 28 each intersecting two other lower rigidifying indentations 29.

As a variant, the direction and the other direction are not necessarily perpendicular. The direction and the other direction may in particular have an angle comprised between 60° and 120°, and preferably comprised between 80° and 100°.

As a variant, the other direction does not necessarily extend parallel to the bottom 22.

As a variant, the direction does not necessarily extend perpendicular to the bottom 22.

As a variant, the direction and the other direction are not necessarily identical for all of the sides 23.

As a variant, not all of the rigidifying lateral indentations 8 and not all of the other rigidifying lateral indentations 9 necessarily extend into the deep fryer tank 2. In particular, at least one of the rigidifying lateral indentations 8 and/or at least one of the other rigidifying lateral indentations 9 may extend outward from the deep fryer tank 2.

As a variant, not all of the rigidifying lateral indentations 8 and not all of the other rigidifying lateral indentations 9 are necessarily surrounded by non-indented portions of the sides 23.

As a variant, not all of the rigidifying lateral indentations 8 and not all of the other rigidifying lateral indentations 9 necessarily extend exclusively along the sides 23. At least one of the rigidifying lateral indentations 8 and/or at least one of the other rigidifying lateral indentations 9 may in particular extend to at least one of the curves 24 and/or one of the other curves 25.

As a variant, not all of the sides 23 necessarily have at least one of the rigidifying lateral indentations 8 and at least one of the other rigidifying lateral indentations 9.

As a variant, at least one of the sides 23 may have at least one of the rigidifying lateral indentations 8 and at least one of the other rigidifying lateral indentations 9.

As a variant, the bottom 22 does not necessarily have at least one lower rigidifying indentation 28 forming a lower recess extending in a first direction and at least one other lower rigidifying indentation 29 forming another lower recess extending in a second direction, with said at least one lower rigidifying indentation 28 intersecting said at least one other lower rigidifying indentation 29.

The deep fryer tank 2 is used like a conventional deep fryer tank. When the frying bath contained in the deep fryer tank 2 is heating up or cooling down, the rigidifying lateral indentations 8 and the other rigidifying lateral indentations 9 rigidify the sides 23 of the deep fryer tank 2 and prevent the phenomena of popping or sudden deformation of the sides 23 caused by the thermal expansion of the material of the deep fryer tank 2. The lower rigidifying indentations 28 and the other lower rigidifying indentations 29 rigidify the bottom 22 of the deep fryer tank 2 and prevent the phenomena of popping or sudden deformation of the bottom 22 caused by the thermal expansion of the material of the deep fryer tank 2. The safety and comfortable use of the deep fryer tank 2 are improved.

The present invention is by no means limited to the exemplary embodiment described and to its variants, but encompasses numerous modifications within the scope of the claims.

The invention claimed is:

1. A deep fryer tank comprising a deep-drawn metal material, the deep fryer tank comprising a bottom and at least first and second sides connected to the bottom by curves, at least one of the first and second sides having at least one first lateral indentation forming a first lateral recess extending in a first direction, wherein the at least one of the first and second sides has at least one second lateral indentation forming a second lateral recess extending in a second direction, wherein the at least one first lateral indentation intersects the at least one second lateral indentation, and wherein the bottom extends continuously along a plane across an entire length and width of the deep fryer tank.

2. The deep fryer tank according to claim 1, wherein the at least one first lateral indentation and the at least one second lateral indentation extend into the deep fryer tank.

3. The deep fryer tank according to claim 1, wherein the at least one first lateral indentation and the at least one second lateral indentation extend exclusively along the at least first and second sides.

4. The deep fryer tank according to claim 1, wherein the at least one first lateral indentation and the at least one second lateral indentation are surrounded by non-indented portions of the at least first and second sides.

5. The deep fryer tank according to claim 1, wherein the first direction and the second direction have an angle between 60° and 120°.

6. The deep fryer tank according to claim 1, wherein the first direction and the second direction are perpendicular to each other.

7. The deep fryer tank according to claim 1, wherein the second direction extends parallel to the bottom.

8. The deep fryer tank according to claim 1, wherein the first direction extends perpendicular to the bottom.

9. The deep fryer tank according to claim 1, wherein all of the at least first and second sides have said at least one first lateral indentation and said at least one second lateral indentation.

10. The deep fryer tank according to claim 1, wherein all of the at least first and second sides have the at least one second lateral indentation and a second second lateral indentation extending parallel to the bottom.

11. The deep fryer tank according to claim 1, wherein the deep fryer tank is parallelepipedal.

12. The deep fryer tank according to claim 1, wherein the at least first and second sides are opposite each other and have the at least one first and a second first lateral indentations extending perpendicular to the bottom.

13. The deep fryer tank according to claim 12, wherein one of the at least one second and the second second lateral indentations of the first and second sides has a greater height between the at least one first lateral indentations than on an outside of the at least one first lateral indentations.

14. The deep fryer tank according to claim 1, wherein the bottom has at least one first lower indentation forming a first lower recess extending in a third direction and at least one second lower indentation forming a second lower recess extending in a fourth direction, said at least one first lower indentation intersecting said at least one second lower indentation.

15. The deep fryer tank according to claim 1, wherein the deep drawn material comprises stainless steel.

16. An electric deep fryer comprising the deep fryer tank according to claim 1 and an electric heating device.

17. The electric deep fryer according to claim 16, wherein the electric heating device comprises an electric immersion heating device configured to be immersed in a frying bath contained in the deep fryer tank.

18. The electric deep fryer according to claim 16, wherein the electric heating device comprises an electric induction heating device configured to heat the deep fryer tank by induction.

19. The electric deep fryer according to claim 16, wherein the deep fryer comprises an outer housing with an upper opening and the deep fryer tank is arranged in the outer housing.

20. The electric deep fryer according to claim 19, wherein the deep fryer tank comprises an outer peripheral rim, the outer housing comprises an upper edge, and the outer peripheral rim rests on the upper edge.

21. A deep fryer tank comprising a deep-drawn metal material, the deep fryer tank comprising a bottom and at least first and second sides connected to the bottom by curves, at least one of the first and second sides having at least one first lateral indentation forming a first lateral recess extending in a first direction, wherein the at least one of the first and second sides has at least one second lateral indentation forming a second lateral recess extending in a second direction, wherein the at least one first lateral indentation intersects the at least one second lateral indentation, and wherein the bottom has at least one first lower indentation forming a first lower recess extending in a first direction and at least one second lower indentation forming a second lower recess extending in a second direction, said at least one first lower indentation intersecting said at least one second lower indentation, wherein the bottom extends perpendicular to the first and second sides.

22. A deep fryer tank comprising a deep-drawn metal material, the deep fryer tank comprising a bottom and at least first and second sides connected to the bottom by curves, at least one of the first and second sides having at least one first lateral indentation forming a first lateral recess extending in a first direction, wherein the at least one of the first and second sides has at least one second lateral indentation forming a second lateral recess extending in a second direction, wherein the at least one first lateral indentation intersects the at least one second lateral indentation, and wherein the bottom has at least one first lower indentation forming a first lower recess extending in a first direction and at least one second lower indentation forming a second lower recess extending in a second direction, said at least one first lower indentation intersecting said at least one second lower indentation, wherein the bottom faces toward and is opposite an upper opening of the deep fryer tank.

\* \* \* \* \*